United States Patent [19]

Sasaki et al.

[11] Patent Number: 5,183,859

[45] Date of Patent: Feb. 2, 1993

[54] POLYMER PARTICLES, PRODUCTION AND USE THEREOF

[75] Inventors: Ichiro Sasaki, Suita; Junji Oshima, Toyonaka; Minoru Yamada, Kawanishi, all of Japan

[73] Assignee: Takeda Chemical Industries, Ltd., Osaka, Japan

[21] Appl. No.: 433,201

[22] Filed: Nov. 8, 1989

[30] Foreign Application Priority Data

Nov. 9, 1988 [JP] Japan .............................. 63-282862

[51] Int. Cl.$^5$ .................. C08F 265/06; C08F 279/02; C08F 265/04

[52] U.S. Cl. .................................. 525/309; 525/310; 525/902; 525/903

[58] Field of Search ............... 525/309, 310, 902, 903

[56] References Cited

U.S. PATENT DOCUMENTS

| | | | |
|---|---|---|---|
| 3,668,274 | 6/1972 | Owens et al. | 260/857 G |
| 3,796,771 | 3/1974 | Owens et al. | 260/857 G |
| 3,984,497 | 10/1976 | Owens . | |
| 4,034,013 | 7/1977 | Lane | 260/835 |
| 4,086,300 | 4/1978 | Owens et al. | 260/885 |
| 4,096,202 | 6/1978 | Farnham . | |
| 4,148,846 | 4/1979 | Owens et al. | 260/885 |
| 4,684,696 | 8/1987 | Bates . | |
| 4,711,913 | 12/1987 | Tateosian . | |

FOREIGN PATENT DOCUMENTS

0137985A3  4/1985  European Pat. Off. .

OTHER PUBLICATIONS

Sperling et al., "Latex Interpenetrating Networks," Journal of Polymer. Mater., vol. 1 (1972), pp. 331–341.
Derwent Abstracts 27094 E/14 (Japan 57-034153 of Feb. 24, 1982).
Derwent Abstracts 87161 C/49 (Japan 55-135157 of Oct. 21, 1980).
Hourston et al., Journal of Applied Polymer Science, vol. 34, 901–908 (1987).

Primary Examiner—James J. Seidleck
Assistant Examiner—Vasu S. Jagannathan
Attorney, Agent, or Firm—Wenderoth, Lind & Ponack

[57] ABSTRACT

A polymer particle is provided comprising a rubbery polymer and a methacrylic glassy polymer as formed in latex interpenetrating polymer networks structure, which is prepared by swelling a rubbery polymer with a swelling solvent and carrying out an emulsion polymerization reaction of methacrylic monomers in the presence of said swollen rubbery polymer. Also provided are a resin composition comprising the polymer particles, such as poly(alkylene terephthate) resin melt-blended with the polymer particles, and a molded article of the resin composition. The molded article has a high impact-strength.

11 Claims, No Drawings

POLYMER PARTICLES, PRODUCTION AND USE THEREOF

The present invention relates to a polymer particle as an impact modifier for poly (alkylene terephthalate) resin, polyamide resin, polycarbonate resin, etc. and a resin composition containing said polymer particles which provides high impact strength and good moldability, in particular.

BACKGROUND OF THE INVENTION

Poly (alkylene terephthalate) resins such as poly (butylene terephthalate) (PBT), poly (ethylene terephthalate) (PET), etc. and polyamide resins such as nylon 6, nylon 66, etc. are inadequate in impact strength and, therefore, many attempts have been made to improve the impact strength.

On the other hand, polycarbonate resin inherently has high impact strength, but because of the remarkable dependency of its impact strength on molded thickness and the high melt viscosity it shows, it has the disadvantage of poor moldability.

A number of impact modifiers have been proposed for incorporation by melt-blending in such resins to improve this quality. Among them, the core-shell polymer consisting of a rubbery core and a glassy shell is characterized by the advantage that because its state of dispersion in the matrix resin is not appreciably influenced by melt-blending conditions, the reproducibility of uniform dispersion can be easily assured.

On the other hand, this core-shell polymer has the disadvantage that because of the small diameter of dispersed particles, the melt viscosity of the resin composition tends to be high.

As a core-shell polymer for improving the impact strength of poly (alkylene terephthalate) resin, a multiphase polymer containing epoxy groups in the outermost shell phase has been proposed in Japanese laid-open Patent, Application No. 74652/1977 but this polymer is not very practically useful because the impact strength-improving effect for poly (alkylene terephthalate) resin is almost negligible and the melt viscosity of the blend is also markedly increased.

Japanese laid-open Patent Application No. 150466/1977 proposes a poly (alkylene terephthalate) resin composition modified with a core-shell polymer containing no epoxy group in the shell phase, and actually some species of the composition show high notched Izod impact strength (⅛ inch thick). However, even those compositions showing high impact strength seemingly have high melt viscosities.

As a core-shell polymer for improving the impact strength of polyamide resin, Japanese laid-open Patent Application No. 6284/1972 proposes a polyamide resin composition modified with a core-shell polymer containing carboxyl groups in the shell phase, and actually some species of the composition have high notched Izod impact strength (⅛ inch thick). However, while giving high impact strength, these compositions show markedly increased melt viscosities, thus being of little practical utility.

Core-shell polymers for improving the impact strength of polycarbonate resin have also been described in more than several publications including Japanese laid-open Patent Application No. 34153/1982, but there is not known a core-shell polymer that is used also for the purpose of improving the moldability.

Although the addition of such impact modifiers to engineering plastics such as polycarbonate resin, poly (alkylene terephthalate) resin, polyamide resin, etc. may result in improved impact strength, the practice inevitably causes increases in melt viscosity. To overcome this disadvantage, many attempts have been made, for example, blending a still another component.

Japanese Patent Publication No. 16976/1987 is an example of such endeavor but even this technique is not free from disadvantages in the aspect of product appearance, such as surface delamination, loss of surface gloss and so on.

In U.S. Pat. No. 4,684,696 it is disclosed that thermoplastic compositions comprised of poly (phenylene oxide) resin with or without a poly (alkenyl aromatic) resin such as polystyrene can be impact modified with a modifying agent having a core-shell structure comprised of an interpenetrating, crosslinked acrylate core and a crosslinked styrenic shell.

But this agent is not enough to improve the impact strength of the resin, and the moldability of the resin is still not improved enough.

DETAILED DESCRIPTION OF THE INVENTION

The inventors of the present invention explored thoroughly into the technology of polymer particles of the core-shell-like polymer structure which would provide engineering plastic compositions with improved impact strength when melt-blended with poly (alkylene terephthalate) resin, polyamide resin, poly (phenylene oxide) resin, polyoxymethylene resin, etc. and found surprisingly that the above-mentioned problems can be neatly solved by melt-blending polymer particles of the under-mentioned core-shell-like structure with such engineering plastics. The present invention is an outgrowth of the above technical finding.

Thus, the present invention relates to a polymer particle comprising a rubbery polymer and a methacrylate glassy polymer as formed in latex interpenetrating polymer networks structure, a method of producing a polymer particle forming latex interpenetrating polymer networks (LIPN), an impact modifier containing the polymer particles, and a resin composition containing said LIPN polymer particles as melt-blended.

The polymer particles according to the present invention can generally be obtained by a consecutive multi-stage emulsion polymerization (seed polymerization) process in which a polymer formed in an earlier stage is covered with a polymer formed in a later stage. In accordance with the present invention, an emulsion polymerization is carried out with rubbery polymer particles previously swollen with a swelling solvent.

Generally, LIPN formed by emulsion polymerization can be synthesized, as described in Journal of Applied Polymer Science 34, 901 (1987), by initiating a polymerization reaction after a first component crosslinked polymer latex prepared by polymerizing a first monomer component is swollen with a second monomer component containing a crosslinking agent.

The degree of swelling depends on the degree of polymer interpenetration (LIPN formation) but when the first component is a rubbery polymer latex and the second component is methacrylate, the necessary swelling cannot be achieved by the usual method and, therefore, the desired interpenetrating polymer networks (IPN) are not sufficiently formed.

The present invention employs a swelling solvent which is not only able to swell the first component polymer sufficiently but is miscible with the second component monomer.

The addition of the second component monomer in the presence of the first component polymer previously swollen by such a swelling solvent enables the second component monomer to penetrate into the first component polymer, thus successfully forming the interpenetrating networks of polymer pairs.

The product of first-stage polymerization is a rubbery polymer (rubbery phase).

This rubbery phase may be comprised of any type of elastomers. Thus, for example, olefinic elastomers, acrylic elastomers, conjugated diene elastomers and thermoplastic elastomers may be mentioned.

Particularly preferred are elastomers containing conjugated diene or $C_{2-8}$ alkyl acrylate or mixtures thereof.

The conjugated dienes mentioned above include, among others, butadiene, isoprene, chloroprene and so on, although butadiene is preferred.

The $C_{2-8}$ alkyl acrylates include, among others, ethyl acrylate, propyl acrylate, butyl acrylate, cyclohexyl acrylate, 2-ethylhexyl acrylate and so on. Particularly preferred is butyl acrylate.

When a conjugated diene or an alkyl acrylate are used in the first-stage polymerization, it may be copolymerized with copolymerizable monomers such as aromatic vinyl compounds and aromatic vinylidenes, e.g. styrene, vinyltoluene, α-methylstyrene, etc., vinyl cyanides such as acrylonitrile, methacrylonitrile, etc., and alkyl methacrylates, e.g. methyl methacrylate, butyl methacrylate, etc.

When the first-stage polymerization is conducted without using a conjugated diene or using it only in a proportion of not more than 20 percent by weight of the total first-stage monomer component, a still higher impact resistance can be achieved by using a crosslinking monomer and/or a graft monomer in minor proportions.

Examples of said crosslinking monomer include aromatic divinyl monomers such as divinylbenzene, etc. and alkane polyol polyacrylates or alkane polyol polymethacrylates such as ethylene glycol diacrylate, ethylene glycol dimethacrylate, butylene glycol diacrylate, butylene glycol dimethacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, trimethylolpropane trimethacrylate and so on. Particularly preferred are butylene glycol diacrylate and hexanediol diacrylate.

The graft monomers mentioned above include, among others, unsaturated carboxylic acid allyl esters such as allyl acrylate, allyl methacrylate, diallyl maleate, diallyl fumarate, diallyl itaconate and so on. Particularly preferred is allyl methacrylate.

The crosslinking monomers and grafted monomers are respectively used in a proportion of 0.01 to 5 percent by weight and preferably 0.1 to 2 percent by weight of the total first-stage monomer.

This rubbery phase preferably accounts for 40 to 90 percent by weight of the total polymer particle. If the proportion of the rubbery phase is either less or more than the above-mentioned range, the impact strength-improving effect of the final resin composition obtained by melt-blending of the polymer particles may not be sufficient.

The glass transition temperature of the rubbery phase is preferably not higher than −20° C. and more preferably not higher than −30° C. If the above limit is exceeded, the ameliorating effect on low-temperature impact resistance may not be as sufficient as desired.

As the swelling solvent used to swell the rubbery phase, a large majority of the common swelling solvents, such as halogenated hydrocarbons, e.g. methylene chloride, chloroform, chlorobenzene, etc., esters, e.g. ethyl acetate, ethyl propionate, etc., and hydrocarbons, e.g. toluene, xylene, etc., can be successfully employed. However, the required level of addition depends on the rubbery phase-swelling effect of the respective solvents.

The other phase (hereinafter referred to as the glassy phase) comprises a methacrylic glassy polymer which is formed by polymerizing one or more monomers of alkyl methacrylates wherein the alkyl group contains 1 to 6 carbon atoms and other copolymerizable monomers.

As examples of the monomer which forms said methacrylic glassy polymer, there may be mentioned methyl methacrylate, tert-butyl methacrylate, sec-butyl methacrylate and iso-butyl methacrylate, inclusive of mixtures of any such methacrylate with other copolymerizable monomers. Preferred are methyl methacrylate and mixtures thereof with other copolymerizable monomers.

The monomers copolymerizable with alkyl methacrylate include, among others, alkyl acrylates such as ethyl acrylate, butyl acrylate, etc., alkyl methacrylates such as ethyl methacrylate, butyl methacrylate, etc., aromatic vinyl compounds and aromatic vinylidenes such as styrene, vinyltoluene, α-methylstyrene, etc., vinyl cyanides and vinylidenes cyanides such as acrylonitrile, methacrylonitrile, etc., and vinyl polymerizable monomers. Preferred are ethyl acrylate, styrene and acrylonitrile.

This glassy phase preferably accounts for 10 to 60 percent by weight of the total particulate polymer. If the proportion of the glassy phase is either less or more than the above range, the impact strength-improving effect of the resin composition obtained by melt-blending of the polymer particles may not be sufficient.

Moreover, the above range is closely related with the necessary amount of the swelling agent. Thus, when the proportion of the glassy phase is large, the impact strength may not be improved unless the swelling agent is used in an increased proportion. Conversely when the proportion of the glassy phase is small, the swelling agent may be used in a smaller amount. The swelling agent (solvent) is usually used in the amount of 10 to 200 parts by weight per 100 parts by weight of the rubbery polymer, preferably 20 to 100 parts by weight.

If the glass transition temperature of this glassy phase is lower than 40° C., the resulting high tackiness will make handling difficult at various stages from drying of the polymer particles to the melt-blending process, thus detracting from the utility of the polymer.

The glass transition temperature of the glass phase is preferably not lower than 40° C. and more desirably not lower than 60° C.

The polymer particle obtained by the process mentioned above generally has a concentration gradient such that the concentration of the glassy polymer is higher in the vicinity of the outer part of the particle. It comprises a rubbery polymer and a methacrylic glassy polymer as formed in LIPN structure.

Among this type of polymer particle, the particle has a core-shell-like structure when its concentration of glassy polymer is very high in the vicinity of its outer part.

The range of the average diameter of the polymer particle is 100 to 1,000 nm, preferably 120 to 600 nm. The polymer particle having the diameter of the range mentioned above is convenient.

The polymer particles according to the invention can be recovered in the form of granules, flakes or powder by the freeze-thaw technique or by salting-out of the synthesized latex. Another preferred method of recovery of polymer particles from the latex is spray-drying with a spray-dryer.

The swelling solvent is preferably removed before this spray-drying operation.

The isolated polymer particle may be further molded into pellets by means of an extruder and a pelletizer or may be directly melt-blended, as it is, with the matrix resin as an impact modifier to make a resin composition.

As examples of the engineering plastic to be employed in accordance with the invention, there may be mentioned poly (alkylene terephthalate) resin, polyamide resin, polycarbonate resin, poly (phenylene oxide) resin, polyoxymethylene resin and so on.

Particularly preferred are poly (alkylene terephthalate) resin, polyamide resin and polycarbonate resin.

Examples of said poly (alkylene terephthalate) resin include PET, poly (propylene terephthalate), PBT and so on. Particularly preferred is PBT.

While poly (alkylene terephthalate) resins are frequently used as polymer alloys by melt-blending with other plastics such as polycarbonate resin, poly(phenylene oxide) resin, etc., the addition of the polymer particles of the invention to the alloy components in this operation results in the increased impact strength and good moldability of the resin composition.

Such melt-blending with poly (alkylene terephthalate)-based polymer alloys also fall within the purview of the present invention.

Examples of the polyamide resin which can be used in this invention include nylon 6, nylon 66, nylon 46, nylon 69, nylon 610 and so on. Particularly preferred are nylon 6 and nylon 66.

While polyamide resins are also frequently used as polymer alloys by melt-blending with other plastics such as polycarbonate resin, poly (phenylene oxide) resin, ABS resin, etc., the incorporation of the polymer particle in the alloy composition by melt-blending results in the increased impact strength and good moldability of the resin composition.

Typical of the polycarbonate resin which can be employed in accordance with the invention is a bis-(hydroxy-aromatic) alkane polycarbonate resin.

Examples of such polycarbonate resin include the resins obtained by reacting bis(hydroxyphenyl)alkanes, such as bis(4-hydroxyphenyl)ethane, 2,2'-bis(4-hydroxyphenyl)propane 2,2'-bis(4-hydroxy-3,5-dichlorophenyl)propane, etc., with phosgene (or diphenyl carbonate).

These polycarbonates can be used alone or as a mixture of 2 or more species. Particularly preferred is a polycarbonate based on bisphenol A (2,2'-bis(4-hydroxyphenyl)propane).

While polycarbonate resins are also used frequently as polymer alloys by melt-blending with other plastics such as polyamide resin, poly (butylene terephthalate) resin, ABS resin, AS resin, acrylic resin, etc., the incorporation of the polymer particle in such alloy composition results in the increased impact resistance and good moldability of the resin composition.

Such melt-blending with a polyamide-based polymer alloy also falls within the purview of the invention.

The above-mentioned product resin composition is a melt-blended mixture containing 2 to 50 weight %, preferably 5 to 40 weight %, of the polymer particles of the invention based on the whole composition.

If the proportion of the polymer particles is less than 2 weight %, the impact strength of the product resin composition may not be appreciably improved, while the use of the polymer particles in excess of 50 weight % may result in substantial decreases in the molded rigidity and heat resistance of the product resin composition.

In the case of a polymer alloy, too, the polymer particle is used in a proportion of 2 to 50 weight %. The preferred melt-blending amount is 5 to 40 weight %.

The polyalkylene terephthalate resin composition, polyamide resin composition and polycarbonate resin composition according to the present invention are invariably prepared by melt-blending.

The melt-blending process is generally carried out at a suitable temperature between 200° and 300° C. where the resin melts and the viscosity of the melt is not too low.

The above temperature ranges from 230° to 280° C. for poly (butylene terephthalate), nylon 6 and bisphenol A polycarbonate.

The melt-blending can be carried out by means of a heating roll, Banbury mixer or single-screw or multi-screw extruder.

Furthermore, the resin composition of the invention may contain suitable amounts of additives.

Such additives may be flame retardants, mold releasing agents, weatherability improvers, antioxidants, antistatic agents, heat builders, colors, reinforcements, surfactants, inorganic fillers, lubricants and so on.

The polymer particle is use as an impact modifier for engineering plastics, as it is, and also in the form of a mixture containing suitable amounts of additives as mentioned above.

A variety of moldings can be manufactured by melt-blending the polymer particles of the invention with engineering plastics to provide resin compositions of the invention and molding the compositions by means of the conventional injection molding machine.

The polymer particle of the invention, when melt-blended with a poly(alkylene terephthalate) resin, polyamide resin or polycarbonate resin, insures a good moldability of the composition while upholding the excellent impact strength, which cannot be obtained with any of the conventional impact modifiers of the core-shell polymer structure.

Furthermore, the moldings obtained from resin compositions containing the polymer particles of the invention show exceptionally high impact strength.

EXAMPLES

The present invention is illustratively described below in further detail by examples and comparative examples, it being understood that these examples are by no means intended to limit the scope of the invention. It should also be understood that parts in these examples are all by weight. Furthermore, the following abbreviations are used in the examples and comparative examples.

| | |
|---|---|
| Butadiene | Bd |
| Styrene | St |
| n-Butyl acrylate | BA |
| Ethyl acrylate | EA |
| Methyl methacrylate | MMA |
| Allyl methacrylate | AlMA |
| 1,4-Butylene glycol diacrylate | BGA |
| Methacrylic acid | MAA |
| Deionized water | DIW |
| Sodium dioctylsulfosuccinate | SSS |
| Sodium dodecylbiphenylethersulfonate | DBES |
| Sodium persulfate | SPS |
| Cumene hydroperoxide | CHP |
| Sodium formaldehyde sulfoxylate | SFS |
| Sodium ethylenediaminetetraacetate | EDTA |
| Sodium hydrogencarbonate | SBC |
| Poly(butylene terephthalate) | PBT |
| Nylon 6 | PA6 |
| Bisphenol A polycarbonate | PC |
| Glass transition temperature | Tg |

As to the glass transition temperature, the peak tan δ temperature of dynamic mechanical analysis on the tensile mode at 10 Hz (determined with Iwamoto Seisakusho VEF-3) was measured and regarded as the glass transition temperature of the sample.

EXAMPLE

Production of impact modifier A

A 2-liter flask equipped with a reflux condenser was charged with 300 g of DIW, 10.0 g of 1% aqueous solution of SSS and 20.0 g of 1% aqueous solution of SBC and the temperature was increased to 70° C. with the charge being stirred under a nitrogen gas stream.

Then, 20.0 g of the first-stage monomer mixture of the following composition was added and dispersed over a period of 10 minutes, at the end of which time 40.0 g of 2% aqueous solution of SPS was added for polymerization of a seed latex.

| First-stage monomer | BA | 323.7 g |
|---|---|---|
| | AlMA | 0.65 g |
| | BGA | 0.65 g |

The remaining 305 g of the first-stage monomer was mixed with 325 g of toluene, a swelling solvent, and further with 100 g of 1% aqueous solution of SSS and 12.5 g of 1% aqueous solution of SBC. The resulting monomer emulsion was continuously fed over 150 minutes for seed polymerization.

The reaction mixture was heated to 80° C. and kept 1 hour and, then, cooled to 70° C. for second-stage polymerization.

Thus, 17.5 g of 2% aqueous solution of SPS was added and 279.65 g of a second-stage monomer emulsion of the following composition was continuously fed over a period of 50 minutes for seed polymerization.

| Second-stage monomer emulsion | |
|---|---|
| MMA | 157.5 g |
| EA | 17.5 g |
| SSS, 1% aqueous solution | 52.5 g |
| SBC, 1% aqueous solution | 17.5 g |

| Second-stage monomer emulsion | |
|---|---|
| DIW | 35.0 g |

The mixture was heated to 80° C. and kept for 1 hour and, then, cooled. After the toluene was removed using a rotary evaporator, the residue was filtered through a 300-mesh stainless steel screen to give a polymer latex containing polymer particles. The diameter of the polymer particles is determined with the COOLTER® Model N4 Sub-micron Particle Analyzer (manufactured by Coolter Electronics, Inc.). This latex was spray-dried at an inlet temperature of 140° C. and an outlet temperature of 70° C .to give an impact modifier A with a particle diameter of 50 to 100 μm.

EXAMPLES 2 and 3

Production of impact modifiers B and C

Using the charge compositions indicated in Table 1, impact modifiers B and C were respectively produced by almost the same emulsion polymerization and spray drying procedure as described in Example 1.

EXAMPLE 4

Production of impact modifiers D

A 5-liter autoclave was charged with 540 g of DIW and 2.4 g of DBES and after the temperature was increased to 50°, the mixture was stirred under a nitrogen gas stream.

After 7.5 g of St and 19.5 g of Bd were added, 0.24 g of CHPO and 1.1 g of an activator solution (prepared from 5.0 g of SFS, 0.5 g of EDTA, 0.05 g of ferrous sulfate, and 50 g of DIW) were added for polymerization of a seed latex.

After completion of the reaction, 1000 g of DIW was added and 2024 g of a monomer emulsion of the following composition, 2.4 g of CHP and 11 g of the same activator solution as described above were continuously fed over 5, 8 and 8 hours, respectively, for first-stage seed polymerization.

| First-stage monomer emulsion | St | 375 g |
|---|---|---|
| | Bd | 1125 g |
| | DBES | 24 g |
| | DIW | 500 g |

After cooling, 916 g of ethyl acetate was added and the mixture was stirred for 1 hour. The reaction mixture was filtered through a 300 mesh stainless steel screen, and after the temperature was increased to 70° C., 67.5 g of 2% aqueous solution of SPS was added. Then, 932 g of a second-stage monomer emulsion of the following composition was fed continuously over a period of 50 minutes for seed polymerization.

| Second-stage monomer emulsion | |
|---|---|
| MMA | 606.15 g |
| EA | 67.5 g |
| BGA | 1.35 g |
| DBES | 2.5 g |
| SBC, 1% aqueous solution | 67.5 g |
| DIW | 187.0 g |

The reaction mixture was heated to 80° C. and kept for 1 hour and, then, cooled. After the ethyl acetate was removed using a rotary evaporator, the residue was filtered through a 300-mesh stainless steel screen to give a polymer latex containing polymer particles. The diameter of the polymer particles is determined with the COOLTER ® Model N4 Sub-micron Particle Analyzer (manufactured by Coolter Electronics, Inc.).

This latex was spray-dried at an inlet temperature of 140° C. and an outlet temperature of 70° C. to give an impact modifier D with a particle diameter of 50 to 100μ.

EXAMPLE 5

Production of PBT resin composition (1)

After 100 parts of Toray PBT 1401×04 and 25 parts of impact modifier A prepared in Example 1 were thoroughly dried, they were mixed and melt-blended using Ikegai Iron Work's twin-screw extruder PCM-30 at a cylinder temperature of 250° C. and a die head temperature of 250° C. to give pellets of PBT resin composition (1).

EXAMPLE 6

Production of PC resin composition (2)

After 100 parts of Mitsubishi Gas Chemical PC Yupilon S2000 and 25 parts of impact modifier B prepared in Example 2 were thoroughly dried, they were mixed and melt-blended using Ikegai Iron Work's twin-screw extruder PCM-30 at a cylinder temperature of 260° C. and a die head temperature of 270° C. to give pellets of a PC resin composition (2).

EXAMPLE 7

Production of PA6 resin composition (3)

After 100 parts of Toray's PA6 CM 1017C and 25 parts of impact modifier C prepared in Example 3 were thoroughly dried, they were mixed and melt-blended using Ikegai Iron Work's twin-screw extruder PCM-30 at a cylinder temperature of 230° C. and a die head temperature of 240° C. to give pellets of PA6 resin composition (3).

EXAMPLE 8

Production of PBT resin composition (4)

After 100 parts of Toray's PBT 1401×04 and 25 parts of impact modifier D prepared in Example 4 were thoroughly dried, they were mixed and melt-blended using Ikegai Iron Work's twin-screw extruder PCM-30 at a cylinder temperature of 250° C. to give pellets of PBT resin composition (4).

COMPARATIVE EXAMPLES 1 to 3

Production of impact modifiers E, F and G

Impact modifiers E, F and G were produced as shown in Table 1.

COMPARATIVE EXAMPLE 4

Production of PBT resin composition (5)

The procedure of Example 5 was repeated except that impact modifier E was used in lieu of impact modifier A to give pellets of PBT resin composition (5).

COMPARATIVE EXAMPLE 5

Production of PC resin composition (6)

The procedure of Example 6 was repeated except that impact modifier F was used in lieu of impact modifier B to give pellets of PC resin composition (6).

COMPARATIVE EXAMPLE 6

Production of PA6 resin composition (7)

The procedure of Example 7 was repeated except that impact modifier G was used in lieu of impact modifier C to give pellets of PA6 resin composition (7).

COMPARATIVE EXAMPLE 7

Production of PBT resin composition (8)

The procedure of Example 5 was repeated except that impact modifier A was not used but PBT resin alone was used to give pellets of PBT resin composition (8).

COMPARATIVE EXAMPLE 8

Production of PC resin composition (9)

The procedure of Example 6 was repeated except that impact modifier B was not used but PC resin alone was used to give pellets of PC resin composition (9).

COMPARATIVE EXAMPLE 9

Production of PA6 resin composition (10)

The procedure of Example 7 was repeated except that impact modifier C was not used but PA6 resin alone was used to give pellets of PA6 resin composition (10).

Tests of Impact Strength

Each of resin compositions (1) through (10) was dried at 120° C. for 4 hours and molded using injection molding machine TS-100 (manufactured by Plastic Industrial Co. Ltd.) at the cylinder and nozzle temperatures shown in Table 2. The molding was notched by machining to prepare Izod impact test pieces with thicknesses of 3.2 mm and 6.4 mm as directed in JIS K7110. Using these test pieces, the impact strength value at 23° C. was determined in accordance with JIS K7110. The determination of moldability was carried out using Flow Tester CFT-500 (manufactured by Simadzu Co.) under the following conditions.

PBT resins (1), (4), (5) and (8)

Pressure 100 Kg.G/$cm^2$, temperature 250° C., the die 1 mm in diameter of 1 mm×2 mm long PC resins (2), (6) and (9)

Pressure 100 Kg.G/$cm^2$, measuring temperature 260° C., the die 1 mm in diameter×2 mm long PA6 resins (3), (7) and (10)

Pressure 80 Kg.G/$cm^2$, measuring temperature 250° C., the die 1 mm in diameter×2 mm long.

The results are set forth in Table 2.

TABLE 1

| | Example No. | | | |
|---|---|---|---|---|
| | 1 | 2 | 3 | 4 |
| Impact modifier | A | B | C | D |

TABLE 1-continued

| | | | | |
|---|---|---|---|---|
| Rubbery phase/glassy phase (weight ratio) | 65/35 | 70/30 | 80/20 | 69/31 |
| Rubbery phase composition (weight ratio) | BA/BGA/AlMA = 99.6/0.2/0.2 | BA/BGA/AlMA = 99.6/0.2/0.2 | BA/BGA/AlMA = 99.6/0.2/0.2 | BD/St = 75/25 |
| Rubbery phase Tg (°C.) | −39 | −40 | −32 | −43 |
| Glassy phase composition (weight ratio) | MMA/EA/BGA = 89.8/10/0.2 | MMA/EA/BGA = 89.8/10/0.2 | MMA/EA/MAA/BGA = 89.9/10/3/0.2 | MMA/EA/BGA = 89.8/10/0.2 |
| Glassy phase Tg (°C.) | 112 | 115 | 110 | 114 |
| Swelling solvent (ratio based on the amount of rubber phase monomer) | Toluene 1.0 | Ethyl acetate 0.6 | Toluene 0.8 | Ethyl acetate 0.6 |
| Diameter of polymer particle | 260 nm | 410 nm | 200 nm | 300 nm |

| | | Example No. | | |
|---|---|---|---|---|
| | | Comp. 1 | Comp. 2 | Comp. 3 |
| | Impact modifier | E | F | G |
| | Rubbery phase/glassy phase (weight ratio) | 65/35 | 80/20 | 80/20 |
| | Rubbery phase composition (weight ratio) | BA/BGA/AlMA = 99.6/0.2/0.2 | BA/BGA/AlNA = 99.6/0.2/0.5 | BA/BGA/AlMA = 99.6/0.2/0.2 |
| | Rubbery phase Tg (°C.) | −42 | −40 | −39 |
| | Glassy phase composition (weight ratio) | MMA/EA/BGA = 89.8/10/0.2 | MMA = 100 | MMA/EA/MAA = 87/10/3 |
| | Glassy phase Tg (°C.) | 117 | 130 | 119 |
| | Swelling solvent (ratio based on the amount of rubber phase monomer) | | | |
| | Diameter of polymer particle | 260 nm | 410 nm | 200 nm |

TABLE 2

| | | | | | Example No. | | | | | | |
|---|---|---|---|---|---|---|---|---|---|---|---|
| | | 5 | 8 | Comp. 4 | Comp. 7 | 6 | Comp. 5 | Ref. 8 | 7 | Comp. 6 | Comp. 9 |
| Resin composition | | (1) | (4) | (5) | (8) | (2) | (6) | (9) | (3) | (7) | (10) |
| Impact Modifier | | A | D | E | — | B | F | — | C | G | — |
| Type of resin | | PBT resin composition | | | | PC resin composition | | | PA6 resin composition | | |
| Izod impact strength (kg · cm/cm) | 3.2 mm thick | 55.6 | 63.4 | 18.9 | 5.4 | 64.5 | 51.7 | 79.0 | 58.6 | 66.8 | 2.9 |
| | 6.4 mm thick | — | — | — | — | 56.1 | 58.3 | 13.3 | 20.4 | 24.0 | 1.5 |
| Flow tester Q value (× 10³ ml/sec) | | 0.80 | 0.76 | 0.44 | 0.50 | 1.04 | 0.22 | 0.21 | 0.47 | 0.33 | 0.92 |
| Molding conditions | Cylinder temperature (°C.) | 250° C. | | | | 260° C. | | | 240° C. | | |
| | Nozzle temperature (°C.) | 250° C. | | | | 270° C. | | | 260° C. | | |

We claim:

1. A polymer particle comprising (1) a rubbery polymer core comprised of conjugated diene elastomers, $C_{2-8}$ alkyl acrylate elastomers or mixtures thereof and (2) a methacrylic glassy polymer shell as formed in latex interpenetrating polymer networks, which is formed by swelling 100 parts by weight of the rubbery polymer with 10 to 200 parts by weight of a swelling solvent wherein the swelling solvent is miscible with methacrylic monomers and carrying out an emulsion polymerization reaction of the methacrylic monomers in the presence of the resultant swollen rubbery polymer.

2. The polymer particle as claimed in claim 1, which contains 40 to 90 weight % of rubbery polymer per the said particle.

3. The polymer particle as claimed in claim 1, which contains 10 to 60 weight % of glassy polymer per the said particle.

4. The polymer particle as claimed in claim 1, wherein the glass transition temperature of the rubbery polymer is not higher than −20° C.

5. The polymer particle as claimed in claim 1, wherein the glass transition temperature of the glassy polymer is not lower than 40° C.

6. The polymer particle as claimed in claim 1, having an average diameter of the particles in the range of 100 to 1,000 nm.

7. The polymer particle ,as claimed in claim 1, which has a concentration gradient such that the concentration of the glassy polymer is higher in the vicinity of the outer part of the particle.

8. An impact modifier containing the polymer particles as claimed in claim 1.

9. A resin composition comprising the impact modifier as claimed in claim 8.

10. The resin composition as claimed in claim 9, wherein the composition contains 2 to 50 weight % of the polymer particles per the whole composition.

11. A molded article of the resin composition as claimed in claim 9.

* * * * *